United States Patent [19]

Lane et al.

[11] Patent Number: 4,472,512

[45] Date of Patent: Sep. 18, 1984

[54] TREATMENT OF MATERIALS

[75] Inventors: Edward S. Lane, Didcot; John A. Winter, West Hanney, both of England

[73] Assignee: United Kingdom Atomic Energy Authority, London, England

[21] Appl. No.: 298,338

[22] Filed: Aug. 31, 1981

[30] Foreign Application Priority Data

Sep. 11, 1980 [GB] United Kingdom ............... 8029341

[51] Int. Cl.³ .................. B01J 13/00; G21C 21/00; C04B 35/51; C04B 35/00
[52] U.S. Cl. ................................ 501/80; 252/315.7; 252/635; 264/0.5
[58] Field of Search .............. 252/317, 635, 315.7; 34/36, 37; 264/0.5; 501/80

[56] References Cited

U.S. PATENT DOCUMENTS

| 2,519,622 | 8/1950 | Archibald et al. | |
|---|---|---|---|
| 2,607,482 | 8/1952 | Weisz | |
| 2,609,925 | 9/1952 | Weisz | |
| 2,746,935 | 5/1956 | Weisz | 34/37 |
| 3,048,929 | 8/1962 | Kremen et al. | 34/36 |
| 3,056,728 | 10/1962 | Ohtaki | 424/34 |
| 4,085,518 | 4/1978 | Jackson et al. | 34/37 |
| 4,349,456 | 9/1982 | Sowman | 252/317 |

FOREIGN PATENT DOCUMENTS

| 569842 | 2/1933 | Fed. Rep. of Germany |
|---|---|---|
| 113620 | 2/1918 | United Kingdom |
| 305076 | 10/1927 | United Kingdom |
| 305066 | 10/1927 | United Kingdom |
| 1238053 | 8/1968 | United Kingdom |

OTHER PUBLICATIONS

Winters, U.S. application Ser. No. 05/843,265, filed 10/18/77.

Primary Examiner—Richard D. Lovering
Assistant Examiner—Catherine S. Kilby
Attorney, Agent, or Firm—Larson and Taylor

[57] ABSTRACT

The present invention relates to the treatment of gel materials to remove water therefrom.

The invention provides a process for removing water from a gel material by contacting the gel material with a gaseous mixture of an organic compound and a gas. The organic compound, the gas and conditions of contacting are selected such that water is extracted from the gel material and passes into the gaseous mixture.

The invention in one embodiment may be used to dry gel materials while maintaining an open porous network therein.

17 Claims, No Drawings

TREATMENT OF MATERIALS

The present invention relates to the treatment of materials and more particularly to the treatment of gel materials to remove water therefrom.

According to one aspect of the present invention a process for removing water from a gel material comprises contacting the gel material with a gaseous mixture comprising an organic compound and a gas, the organic compound, the gas and conditions of contacting being selected such that water is removed from the gel material and passes into the gaseous mixture.

Where the invention is to be used to remove water from a gel material whilst maintaining an open porous network therein it is preferred that the organic compound in the gaseous mixture is such that organic compound is taken up by the gel material. This is discussed in further detail hereinafter.

The gel material is preferably in a selected physical configuration such as a gel body or bodies. The gel material in accordance with one embodiment of the invention can comprise a plurality of particles (e.g. substantially spherical particles).

An elevated operating temperature may be used to increase the rate of water removal from the gel material. An elevated operating temperature may be achieved, for example by using a gaseous mixture heated to an elevated temperature prior to contacting with the gel material.

Gaseous mixture which has been used to remove water from the gel material, and hence has taken up water, can be subsequently treated to remove water therefrom and recycled. If desired gaseous mixture can be treated to separate water and organic compound. Thus, for example, the water and organic compound can be condensed from the gaseous mixture. The water and organic compound separated from the gas can be treated to recover the organic compound for re-use (e.g. by phase separation or distillation from water).

It will be appreciated that whilst the water will normally be expected to be present as vapour in the gaseous mixture after being removed from the gel material it may be that in some circumstances liquid water as such may be entrained in the gaseous mixture.

In one embodiment the gaseous mixture comprises a gas and vapour derived from an organic liquid. Such a gaseous mixture may be formed for example, by passing gas through an organic liquid (e.g. by bubbling gas through the liquid) or by passing gas over an organic liquid.

Preferably the gas is substantially saturated with vapour derived from organic liquid in forming the gaseous mixture.

Gases suitable for use in accordance with the present invention include air, nitrogen, argon and carbon dioxide. Factors influencing the choice of gas include cost, inertness to the gel material and to the organic compound and the inflammability of the gaseous mixture of the organic compound and the chosen gas.

Any convenient method of contacting the gel material with the gaseous mixture may be used. Thus, for example, the gaseous mixture may be passed over the gel material.

By way of further example the gaseous mixture may be passed over or through a bed of gel bodies.

The present invention may be used for removing water from gel materials produced by a variety of gel processes exemplary of which are gel precipitation processes, sol-gel processes and internal gelation processes.

The water requiring removal may arise from reagents used in forming the gel material or from washing the gel material with water, for example to remove reagents used in forming the gel material.

Also the present invention finds one application in removing water from gel materials prior to the treating of such materials to form ceramic products.

The formation of ceramic products from gel materials normally involves one or more heating operations. These heating operations can lead to difficulties in obtaining a satisfactory ceramic material.

Thus, gel materials usually contain certain substances which give rise to gaseous products on heating. If these gaseous products are unable to escape satisfactorily the gel materials can be ruptured by release of built up internal pressure.

This can be particularly undesirable where a ceramic product of high integrity, density and uniformity is required. Ceramic microspheres, particularly those for nuclear application such as in nuclear fuel production, are examples of ceramic products which often have to meet rigorous requirements with regard to integrity, internal structure, density and uniformity.

In the case of certain gel materials, for example, those used by a sol-gel process, the major source of gaseous products on heating can be internally retained water. However, in the case of gel materials produced by a gel precipitation process an important source of gaseous products is the organic gelling agent which decomposes on heating.

In the case of a gel material produced by an internal gelation process important sources of gaseous products on heating are the compounds which derive from the reagent used to effect internal gelation.

As is known in the art the conversion of a gel material produced by a gel precipitation process to a ceramic material involves, inter alia, a heating step to decompose the gelling agent to gaseous products which are removed. This process of removing organic substances is referred to in the gel precipitation art as "debonding". If carbon is not to be removed but is to be retained in the gel material, for example to be utilised for carbide formation, heating will be effected in an atmosphere which whilst permitting the decomposition of organic substances does not lead to the removal of carbon as gaseous products. (In this latter case "debonding" is practised in the sense that organic compounds are decomposed but the carbon produced therefrom is not removed from the gel materials).

Gel materials can be formed with an open porous network. To avoid the aforementioned difficulties with internal pressure it is necessary to ensure that the process used in removing water from the gel material permits retention of an open porous network for the escape of gaseous products.

It has been found that air drying of gel materials can lead to a shrinkage of the open porous network to a point where the aforementioned difficulties of internal pressure are encountered on subsequent heating.

In accordance with an embodiment of the present invention there is provided a process for removing water from a gel material having an open porous network which comprises contacting the gel material with a gaseous mixture comprising an organic compound and a gas, wherein the organic compound, the gas and conditions of contacting are selected such that water is removed from the gel material and passes into the gaseous mixture, and wherein the organic compound is such that it permeates the gel material so as to maintain an open porous network as water is extracted and such that an open porous network remains after removal of organic compound from the gel material.

In one preferred embodiment the gel material comprises a plurality of substantially spherical particles produced by a gel precipitation process.

Thus the present invention may be used, in one embodiment, in the preparation of substantially spherical ceramic particles (e.g. ceramic microspheres) which are not substantially cracked nor broken and therefore have good integrity.

UKAEA British Patent Nos. 1175834, 1231385, 1253807, 1313750 and 1363532 relate to gel precipitation processes and references should be made to these for information regarding such processes. British Patent No. 1313750 discloses "modifying agents" which can be used in gel precipitation processes (e.g. in the preparation of actinide metal oxide ceramic particles containing uranium oxide and/or plutonium oxide).

Briefly, in the production of a ceramic body by one form of gel precipitation process (known as "forward gel precipitation") a feed solution containing a compound of an element (typically of a metal) and an organic gelling agent, or agents, is introduced into a precipitating agent in a desired physical form (e.g. droplets) to give a gel material in a desired physical configuration (e.g. particles, aggregates, tubes or threads) containing the element. (It will be understood that the element will generally be present in a form of a chemical compound rather than as the free element). It is to be noted that in the gel precipitation art organic gelling agents are sometimes called "gelating agents" or "protective agents". Where appropriate an acidic precipitating agent may be used. A typical precipitating agent is a basic reagent such as ammonium hydroxide. The feed solution may also contain other constituents such as a modifying agent as hereinbefore mentioned. The gel material is subsequently washed with water, treated to debond it and heated to give a ceramic product. If a carbide product is to be formed, carbon may be included in the feed solution and a further carbothermic reduction step to be effected after debonding. The organic gelling agent enables the feed solution to gel in a coherent manner in the presence of a precipitating agent.

A gel body as formed by the gel precipitation step may be considered as being a coherent structure of controlled shape containing primary particles precipitated from the feed solution and an extended polymer network formed from the gelling agent in the feed solution, the primary particles and the polymer network being arranged to give an open porous network within the gel body.

Conveniently a gel material (such as a plurality of gel particles) is shaken free of loosely adhering water before being contacted with the gaseous mixture in accordance with the present invention.

The process of the present invention can be carried out so as to removal all extractable water from a gel material, or, if desired, only to remove a portion of the water from the gel material (e.g. remove say 25% of the extractable water).

In the latter case the gel material can be subjected to other drying methods as appropriate to the purpose for which the de-watered gel material is to be used. Thus, for example, providing removal of water in accordance with the present invention has been effected to an extent that sufficient open porous network can be maintained after removal of the organic compound to permit satisfactory escape of gaseous products on debonding, residual water may be removed, together with organic compound, by air-drying.

It is preferred that the gel material should be substantially inert to the organic compound (i.e. the organic compound should not be capable of affecting the gel material adversely by chemical or other reaction).

It is also preferred that the organic compound has a high flash point. Inflammability dangers may be reduced by the use of inert gases such as argon and nitrogen.

In accordance with the present invention it has been found that it is preferable that the organic compound has a low solubility in water (i.e. less than 5%). Preferably the solubility is less than or equal to 1%.

Also it is preferred that the organic compound should have a boiling point substantially above that of water (i.e. a lower volatility than water at a given temperature).

Where the organic compound is one which can be taken up by the gel material it is preferred that the organic compound is one capable of extracting water from the gel material. In these circumstances it has been found that it is generally sufficient for the organic compound to have a water saturation content of 1 to 20% by weight. The organic compound may be in the form of vapour of an organic liquid which is capable of extracting water from the gel material and examples of such organic liquids are aliphatic alcohols (such as n-hexanol, 2-ethyl-hexanol, ethyl butanol and mixtures of these) and related homologues, amyl alcohol and amines (providing, of course, that the chosen amine does not interact adversely with the gel material).

Examples of organic compounds which may be used in accordance with the present invention, but which do not have any substantial capability of extracting water from the gel material are hydrocarbons (e.g. kerosene) and halogenated hydrocarbons (e.g. trichloroethane and perchloroethane). Certain other organic liquids such as ketones (e.g. methylisobutyl ketone) may also be used as a source organic compound vapour.

The suitability of a given organic compound for use in the gaseous mixture in accordance with the present invention can be readily determined by trial.

The rate of water removal from the gel material may be controlled (e.g. by control of flow rate of the gaseous mixture) to give a relatively slow rate of water removal at the beginning of the process of removing water followed by a more rapid removal of water at a later stage in the process. Thus, if necessary, "shock drying" may be substantially avoided.

Where the present invention is to be used to remove water from a gel material whilst maintaining an open porous network therein and the organic compound in the gaseous mixture is such that organic compound is taken up by the gel material it will be appreciated that removal of organic compound from the gel material can be effected when sufficient water has been removed from the gel material that it is hardened to an extent that the porous network is stabilised.

Organic compound can be removed by a number of techniques (e.g. heating).

Whilst the process of removing water from a gel material in accordance with the present invention may be particularly useful in the production of ceramic particles for use as nuclear fuel where it can be important that the particles are free from cracks and surface defects the invention finds application in non-nuclear fields (e.g. in the drying of alumina particles for catalytic applications).

Where the present invention is to be used to remove water whilst still maintaining an open porous network in the gel material, and the organic compound is such that it can be taken up by the gel material it is believed, but by no means certain, that the process of the present invention may depend at least in part on the fact that the organic compound maintains within a gel material surface tension forces which otherwise would be lost on removal of water and thereby permits an open porous network to be retained. It is also believed that the miscibility of water with the organic compound is a factor influencing the maintenance of the porous network.

The invention also provides in another aspect a gel material from which water has been removed by a process in accordance with the present invention.

Certain gel materials (e.g. those produced by a gel precipitation process) are preferably "conditioned" with water prior to being heated to remove water in accordance with the present invention.

The nature of conditioning is complex and not fully understood, however, conditioning does increase the stability of the gel material with respect to maintaining its integrity and consistency of quality during subsequent removal of water. Conditioning in part involves a growth of crystallite size and an increase in the average pore size, and is thought to assist in the stabilising of an open porous network in the gel material. The contacting with water may be achieved for example by contacting the gel material with water as such (preferably at 60° to 100° C.) or contacting with wet steam.

The degree of conditioning required can be determined by experimentation for a particular gel material.

The invention will now be further described by way of example only as follows (Examples 1 and 4 to 7 inclusive are examples of removing water from a gel material in accordance with the present invention and Examples 2 and 3 are comparative examples of removing water by a process not in accordance with the present invention).

EXAMPLE 1

A gel precipitation feed solution was prepared by adding 350 mls of aluminium chlorohydrate solution to 500 mls of a 5% aqueous Wisprofloc P solution. (Wisprofloc P (RTM) is a cationic starch derivative made by W. A. Scholtens' Chemische Fabrieken, NV Holland). This feed solution was added dropwise into 0.880 SG ammonium hydroxide solution (the concentration of which was maintained above 12M during the addition of feed by sparging with ammonia gas). The spheroidal gel particles of gel precipitate thus produced were soaked in the ammonium hydroxide solution for 1 hour then removed, washed with cold water, heated in water to 100° C., allowed to cool and drained.

Water was removed from the drained gel particles by contacting them, at ambient temperature, with a gaseous mixture comprising air saturated with n-hexanol vapour for 36 hours. The gaseous mixture was prepared by bubbling air through an n-hexanol liquid at ambient temperature at 6 l,min$^{-1}$. Excess hexanol which had permeated the gel particles was removed by air at room temperature. The gel particles were then heated to 900° C. in air to effect debonding.

The porosity of the resulting particles, calculated from the densities determined by immersion in carbon tetrachloride and in mercury was 0.67cm$^3$ g$^{-1}$.

These particles were sintered in Ar/4% H$_2$ at 1400°–1450° C. After sintering the particles were of good integrity being substantially free of cracks.

EXAMPLE 2

Gel particles were prepared by the same procedure as Example 1 with the exception that water was not removed therefrom by use of a gaseous mixture of air and hexanol vapour. Instead the gel particles, after being washed, heated in water to 100° C., cooled and drained, were allowed to dry in trays in air at room temperature. The dried gel particles were then heated to 900° C. in air to affect debonding.

The porosity of the resulting material was determined (as in Example 1) to be 0.14cm$^3$ g$^{-1}$.

Comparing the porosities obtained in Examples 1 and 2 it can be seen that the gel particles from which water was removed by a gaseous mixture of n-hexanol and air gave a product of greater porosity than the gel particles which were air dried.

This demonstrates that porosity resulting from removing water from the gel particles in accordance with the present invention is retained after debonding.

The resulting debonded particles were sintered in Ar/4% H$_2$ as in Example 1. The resulting sintered particles were cracked, misshapen or broken in contrast with the sintered particles obtained in Example 1.

EXAMPLE 3

Substantially spherical gel precipitated particles (of 3 mm diameter) were prepared from a mixture of thorium and uranyl nitrate solutions using polyacrylamide as a gelling agent and ammonium hydroxide as a precipitating agent in accordance with British Patent Specification No. 1363532 (UKAEA). The gel particles were washed with water and dried in air at room temperature.

The dried particles were dense, had little porosity (0.015cm$^3$ g$^{-1}$, determined as in Example 1) and showed cracking.

After debonding (by heating in air at 700° C.) and subsequent sintering in argon/4% H$_2$ the particles had broken into fragments.

EXAMPLE 4

The procedure of Example 3 was followed with the exception that the gel particles after washing were not dried in air. Instead water was removed from the gel particles by contacting them with a gaseous mixture comprising air saturated with n-hexanol vapour (produced by passing air over liquid h-hexanol at ambient temperature).

The dried gel particles thus produced were substantially crack-free and had an open pore structure (porosity of 0.700cm$^3$ g$^{-1}$ determined as in Example 1).

On subsequent debonding by heating at 700° C. and sintering in argon/4% H$_2$ the particles gave a dense (TD 98%) substantially crack-free product.

EXAMPLE 5

The procedure of Example 3 was followed with the exception that the gel particles after washing were not dried in air. Instead water was removed from the gel particles by contacting them with a gaseous mixture comprising argon saturated with n-hexanol vapour (produced by passing argon over liquid n-hexanol at ambient temperature).

The dried gel particles thus produced were substantially crack-free and had an open pore structure (porosity of 0.562cm$^3$ g$^{-1}$ determined as in Example 1).

On subsequent debonding by heating at 700° C. and sintering in argon/4% H$_2$ the particles gave a dense (TD 98%) substantially crack-free product.

EXAMPLE 6

The procedure of Example 3 was followed with the exception that the gel particles after washing were not dried in air. Instead water was removed from the gel particles by contacting them with a gaseous mixture comprising air saturated with trichloroethane vapour (produced by passing air over liquid trichloroethane at ambient temperature).

The dried gel particles thus produced were substantially crack-free and had a porosity of 0.085cm$^3$ g$^{-1}$ (determined in Example 1). This value is significantly lower than that obtained in Examples 4 and 5 in which the organic compound used was one capable of extracting water from the gel material.

EXAMPLE 7

The procedure of Example 3 was followed with the exception that the gel particles after washing were not dried in air. Instead water was removed from the gel particles by contacting them with a gaseous mixture comprising air saturated with perchloroethane (produced by passing air over liquid perchloroethane at ambient temperature).

The dried gel particles thus produced were substantially crack-free and had a porosity of 0.125cm$^3$ g$^{-1}$ (determined as in Example 1).

We claim:

1. A process for removing water from a gel material comprising contacting the gel material with a preformed gaseous mixture comprising a gas and an organic compound in the form of a vapor derived from an organic liquid, the gas, the organic liquid and conditions of contacting being selected such that water is removed from the gel material and passes into the gaseous mixture while an open porous network is maintained in the gel material.

2. A process as claimed in claim 1 wherein the organic compound in the gaseous mixture is such that organic compound is taken up by the gel material.

3. A process as claimed in claim 1 for removing water from a gel material having an open porous network which comprises contacting the gel material with a gaseous mixture comprising an organic compound and a gas, wherein the organic compound, the gas and conditions of contacting are selected such that water is removed from the gel material and passes into the gaseous mixture, and wherein the organic compound is such that it permeates the gel material so as to maintain an open porous network as water is extracted and such that an open porous network remains after removal of organic compound from the gel material.

4. A process as claimed in claim 1 wherein the gel material comprises a plurality of particles of gel material.

5. A process as in claim 1 wherein the gaseous mixture is formed by passing a gas through or over said organic liquid.

6. A process as claimed in claim 1 wherein the gas is substantially saturated with vapour derived from said organic liquid.

7. A process as claimed in claim 1 wherein said mixture consists essentially of a gas selected from the group consisting of air, nitrogen, argon or carbon dioxide and said vapor.

8. A process as claimed in claim 1 wherein the contacting of the gel material with the gaseous mixture is achieved by passing the gaseous mixture over the gel material.

9. A process as claimed in claim 1 wherein the contacting of the gel material with the gaseous mixture is achieved by passing the gaseous mixture over or through a bed of gel bodies.

10. A process as claimed in any one of the preceding claims wherein the organic compound has a solubility in water of <5%.

11. A process as claimed in claim 10 wherein the organic compound has a solubility in water of ≦1%.

12. A process as claimed in claim 1 wherein the organic compound has a boiling point substantially above that of water.

13. A process as claimed in claim 7 wherein the organic compound is in the form of vapour of an organic liquid selected from the group consisting of aliphatic alcohols or related homologues, amyl alcohol and amines.

14. A process as claimed in claim 7 wherein the organic compound is in the form of vapour of an organic liquid selected from the group consisting of hydrocarbons and halogenated hydrocarbons.

15. A process as claimed in claim 1 wherein the gel material is conditioned with water prior to the removing of water from the gel material.

16. A process as claimed in claim 1 wherein the gel material has been produced by a gel precipitation process, a sol-gel process or an internal gelation process.

17. A process as claimed in claim 1 including the further step of producing a ceramic product by heating gel material from which water has been removed.

* * * * *